(12) United States Patent
Faircloth, Jr.

(10) Patent No.: US 12,239,928 B2
(45) Date of Patent: Mar. 4, 2025

(54) STORMWATER SKIMMER SURFACE DRAIN APPARATUS

(71) Applicant: J.W. Faircloth & Son, Inc., Hillsborough, NC (US)

(72) Inventor: Jesse Warren Faircloth, Jr., Hillsborough, NC (US)

(73) Assignee: J.W. Faircloth & Son, Inc., Hillsborough, NC (US)

( * ) Notice: Subject to any disclaimer, the term of this patent is extended or adjusted under 35 U.S.C. 154(b) by 490 days.

(21) Appl. No.: 17/676,661

(22) Filed: Feb. 21, 2022

(65) Prior Publication Data
US 2022/0268009 A1 Aug. 25, 2022

Related U.S. Application Data

(60) Provisional application No. 63/152,059, filed on Feb. 22, 2021.

(51) Int. Cl.
| | | |
|---|---|---|
| *B01D 35/05* | (2006.01) | |
| *B01D 21/00* | (2006.01) | |
| *B01D 21/24* | (2006.01) | |
| *E03F 5/10* | (2006.01) | |
| *C02F 103/00* | (2006.01) | |

(52) U.S. Cl.
CPC ......... *B01D 35/05* (2013.01); *B01D 21/0027* (2013.01); *B01D 21/2444* (2013.01); *E03F 5/103* (2013.01); *E03F 5/106* (2013.01); *B01D 2221/12* (2013.01); *C02F 2103/001* (2013.01)

(58) Field of Classification Search
CPC ................ B01D 35/05; B01D 21/0027; B01D 21/2444; B01D 2221/12; E03F 5/103; E03F 5/106; C02F 2103/001; E04H 4/1263
See application file for complete search history.

(56) References Cited

U.S. PATENT DOCUMENTS

| | | | | |
|---|---|---|---|---|
| 882,030 | A * | 3/1908 | Traulsen ................ | B01D 35/05 137/578 |
| 4,179,379 | A * | 12/1979 | Mitchell ................ | B01D 29/01 210/242.1 |
| 4,405,458 | A * | 9/1983 | McHugh, Jr. ...... | B01D 17/0214 210/242.1 |
| 4,746,424 | A * | 5/1988 | Drew .................... | E04H 4/1263 210/167.2 |

OTHER PUBLICATIONS

Thirsty Duck Inc., "Thirsty Duck," brochure, believed to be available at least as early as 2018, 2 pages.
Lane Enterprises, Inc., "The Reverse Q Pond Outlet: Helping to Protect the Quality of Our Waterways," brochure, believed to be available at least as early as 2007, 2 pages.
Rymar Waterworks Innovations, "Marlee Float," brochure, believed to be available at least as early as 2020, 2 pages.

(Continued)

*Primary Examiner* — Liam Royce
(74) *Attorney, Agent, or Firm* — Reinhart Boerner Van Deuren s.c.

(57) ABSTRACT

A drainage device is provided. The device includes a novel floating surface drain or skimmer to manage draining of liquid, such as draining of water from stormwater impoundment ponds or structures.

10 Claims, 14 Drawing Sheets

(56) References Cited

OTHER PUBLICATIONS

Innovative Applied Solutions, LLC, "IAS Water Quality Skimmer for Sediment and Erosion Control Applications," brochure, believed to be available as least as early as 2017, 2 pages.
Erosion Supply Company, "The Erosion Supply Company Sediment Basin Skimmer," brochure, believed to be available at least as early as 2019, 2 pages.
Bafter Skimmers, "Bafter Skimmers," brochure, believed to be available at least as early as 2019, 2 pages.
Turtle Creek Erosion Products, "Detention Pond Skimmer," https://www.tcerosionproducts.com/ believed to be available at least as early as Feb. 11, 2022, 7 pages.

* cited by examiner

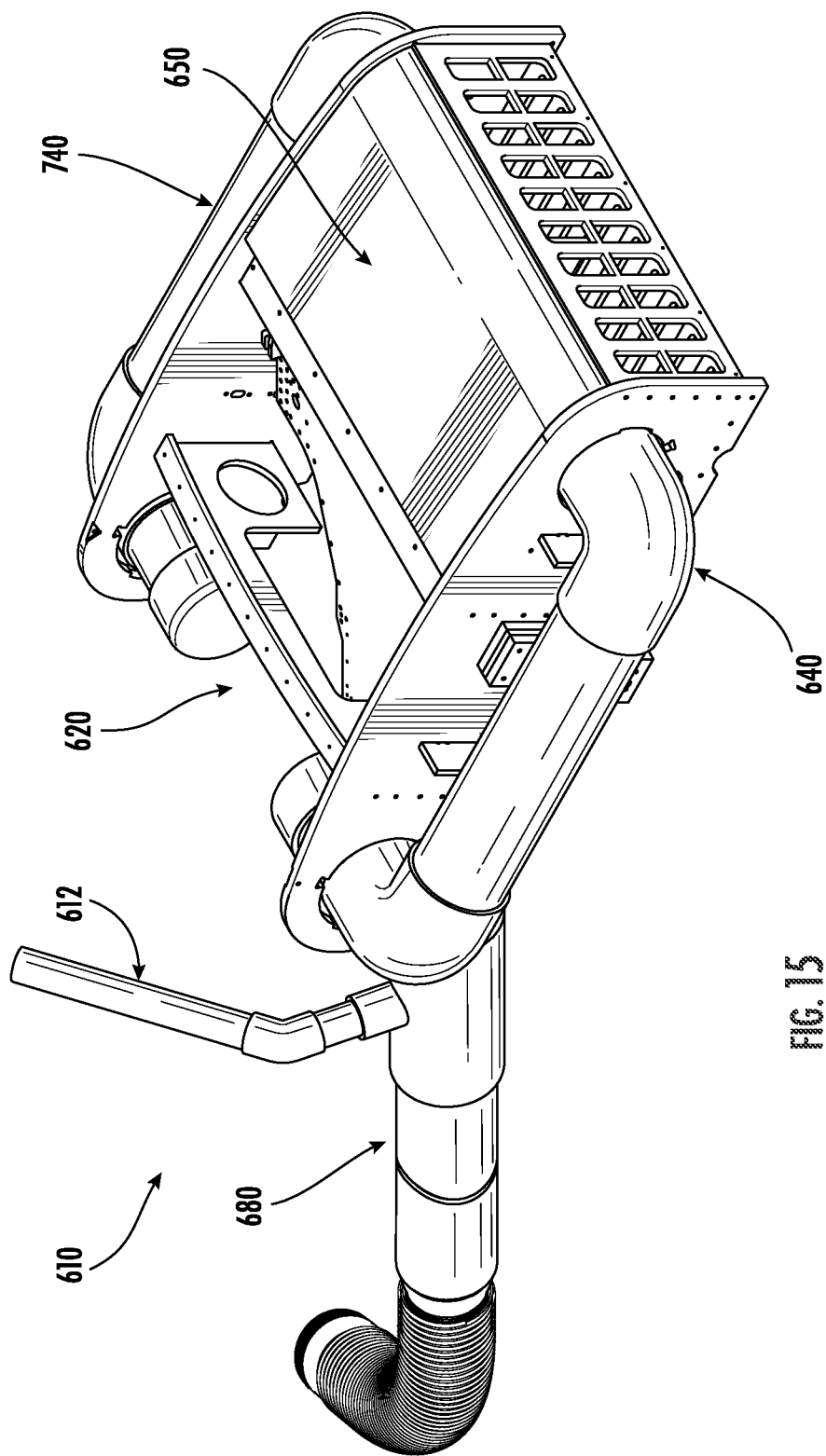

STORMWATER SKIMMER SURFACE DRAIN APPARATUS

CROSS-REFERENCE TO RELATED PATENT APPLICATION

The present application claims the benefit of and priority to U.S. Provisional Application No. 63/152,059, filed on Feb. 22, 2021, which is incorporated herein by reference in its entirety.

FIELD OF THE INVENTION

The invention relates to draining water impoundments and particularly to controlling the filling and draining at a known rate and in a controlled manner from near the surface. This also relates to water pollution control and more particularly to control systems using sediment and stormwater basins that capture and briefly store storm runoff from disturbed areas and developments that use surface drains or skimmers to regulate the filling and draining of the basin and release the cleanest water from near the surface as opposed to releasing the most polluted from the bottom.

BACKGROUND OF THE INVENTION

This novel device is part of the art of regulating the filling and draining of an impoundment of stormwater runoff from a construction site or completed development at a controlled and known rate from near the surface to release the cleanest water in the basin, which is near the surface because of gravity settling. This allows gravity settling of debris and soil particles toward the bottom, to contain pollutants in the basin and protect downstream resources while releasing cleaner water from near the surface.

Local and State governments and the Federal Environmental Protection Agency regulations usually require construction and development projects to control stormwater runoff to prevent increased rates of runoff that can cause flooding and water pollution. These requirements are often met by using stormwater impoundment basins or structures that capture runoff, store it for a certain period of time, treat it in various ways and eventually release it at a maximum permitted rate. Conventional means of regulating the filling and draining (typically a small orifice at the bottom of the outlet structure) are simple but have undesirable flow characteristics that put constraints on the basin design, in particular the depth is limited, sometimes in inconvenient ways that require the basin to occupy a large area. The head on the orifice, i.e., the depth of water over it, varies as the basin fills and drains, resulting in a flow rate too low when the head is low and too great when the head is high.

In addition, outlets located at the bottom have to be small (because of the variable head on it) and can easily clog with sediment and debris washed into the stormwater basin. The result is that the basin does not function properly, can become unattractive, can clog with undesirable vegetation and can be difficult to maintain.

SUMMARY OF THE INVENTION

One embodiment of the invention relates to a water management device configured to drain water from a stormwater pond. The water management device includes a sluice, a buoyancy device coupled to the sluice, and a drainage element pivotably coupled to the sluice. The sluice includes a housing defining a chamber, and a front wall defining a front of the chamber. The housing defines a plurality of openings configured to permit the water outside the sluice to enter the chamber. The front wall defines an aperture configured to permit the water to exit the chamber. The buoyancy device is configured to bias the sluice towards a top of the water. The drainage element is configured to receive the water exiting the chamber and direct the water away from the sluice. The drainage element includes a tapered inlet extending along a longitudinal axis, and a channel extending away from the tapered inlet. The tapered inlet includes an input disposed against the aperture of the front wall, an output opposite the input, and sidewalls extending between the input and the output. The sidewalls narrow from the input to the output at an angle between 12 degrees and 30 degrees with respect to the longitudinal axis. The channel is configured to receive the water from the aperture via the tapered inlet and direct the water away from the sluice.

Another embodiment of the invention relates to a water management device configured to drain water from a stormwater pond. The water management device includes a sluice, a buoyancy device coupled to the sluice, and a drainage element pivotally coupled to the sluice. The sluice includes a housing defining a chamber, the housing defining a plurality of openings configured to permit the water outside the sluice to enter the chamber, and a front wall defining a front of the chamber. The front wall defines an aperture configured to permit the water to exit the chamber. The buoyancy device is configured to bias the sluice towards a top of the water. The drainage element is configured to receive the water exiting the chamber and direct the water away from the sluice. The drainage element includes an inlet, a channel extending away from the inlet, and a tapered collar. The inlet extends along a longitudinal axis and includes an input disposed against the opening of the front wall and an output opposite the input. The channel extends away from the inlet and is configured to receive the water from the aperture via the tapered inlet and direct the water away from the sluice. The tapered collar is positioned between the output of the inlet and the drainage channel. An outer surface of the tapered collar interfacing with the water smoothly transitions from a square profile proximate the output of the inlet to a circular profile at the drainage channel.

Another embodiment of the invention relates to a water management device configured to drain water from a stormwater pond. The water management device includes a sluice, a buoyancy device coupled to the sluice, and a drainage element pivotally coupled to the sluice. The sluice includes a housing defining a first chamber, a front wall, and a front plate. The housing defines a plurality of openings configured to permit the water to enter the first chamber. The front wall defines a front of the first chamber, and the front wall defines an opening configured to permit the water to exit the first chamber. The front plate is coupled to the front wall such that at least a portion of the front plate obstructs the opening in the front wall. The front plate is configured to be selectively coupled to the front wall at a plurality of locations that each result in the front plate providing a different degree of obstruction to the opening of the front wall. The buoyancy device is configured to position the sluice at a top of the water. The drainage element is configured to receive the water exiting the first chamber and direct the water away from the stormwater pond.

Various aspects of the invention include a float portion, a frame-sluice structure, a sluice opening, a hinged outlet flume portion, an outlet pipe portion, and a flexible hose portion which are sequentially connected. The apparatus operates by gravity flow, requiring no other source of power or electrical connection. A float provides buoyancy for the apparatus and is connected to and supports the frame-sluice structure and sluice opening. The frame-sluice structure pivotally supports the outlet flume downstream of the sluice opening. The lower portions of the frame structure and outlet flume are suspended below the water surface in a sediment retention pond or stormwater control basin. The frame has slotted openings in the bottom and side that allow water inside the frame to the sluice opening while trapping debris on the outside. The float also acts to trap floating debris. A vertical rectangular sluice opening inside the frame structure allows water to be discharged at a controlled rate into the outlet flume and out the pipe to drain the basin. A sluice board is used to vary the height of the sluice opening to regulate the rate of flow from the basin at a known rate. Rods projecting from and supported by the vertical sides of the frame allow the flume to rotate within a limited range as the apparatus floats up and down with the changing water level in the basin and the lower end of the flexible hose remains fixed to a connection on the outlet of the basin. A rubber seal connects and closes the gap between the horizontal edges where the frame and flume meet. Additional vertical seals between the sluice and flume are provided on each side of the sluice opening. The ends of the seals on the flume hinges fit snugly between the two sides of the fixed hinge-seals on the sluice to create a nearly watertight connection, with only minimal leakage, allowing only or mostly only water flowing through the sluice opening to enter the outlet flume and be discharged into the pipe. The pipe inlet is provided with a tapering, funnel shaped flow transition device to improve the flow of water from the flume into the pipe to increase the pipe's flow capacity over what it would be with just a square end inlet on the pipe. The outlet end of the flume is connected to the flexible hose by a solid pipe of varying length, the length determined by the depth of the basin and the vertical range that the device is required to rotate. The outlet end of the flexible hose is attached securely to the basin's outlet while the upper end is free to move vertically, allowing the float, frame structure and flume to float up and down as the water level rises and falls while maintaining a secure, watertight connection. Ballast for the apparatus is placed and secured inside the float tubes to counter the upward buoyancy caused by the pipe being partially empty. In various embodiments, an air vent is supplied on the pipe Tee at the outlet end of the flume to allow air into the pipe when necessary.

Following are features of various embodiments of this disclosure:

1 Floating surface drain device, commonly referred to as a skimmer, to release the outflow from a stormwater basin or other type of impoundment from near the surface.

2 To control the filling and draining at a desired and known rate.

3 The design incorporates a unique configuration of the flow controlling orifice (a sluice gate) and outlet (flume) that has numerous advantages over existing designs. It can be larger and less likely to clog.

4 Device releases water through an adjustable sluice gate at a known, constant rate with a constant head on the orifice.

5 Releases flow from near the surface at a known, constant rate.

6 Releases the cleanest water in the basin from near the surface.

7 Novel configuration maintains a uniform head on the controlling sluice gate/orifice providing a uniform draw-down/draining release.

8 Float provided to keep the inlet on the water surface as the basin fills and drains and keeps the sluice gate suspended under the water surface at a known, constant depth.

9 Device replaces typical conventional stormwater basin outlets at the bottom of the basin with a variable head and, consequently, a variable flow rate as the basin's water level rises and falls because of the varying head and resulting uneven flow rate.

10 Wide, low positioned sluice gate/orifice design allows full flow rate early (as the basin begins to fill) in basin filling, reducing necessary/required storage volume.

11 Simple, gravity flow operation with provision to adjust the height of the sluice and vary the flow rate, customizing the flow as needed for the particular installation.

12 Sluice gate height can be adjusted using a sluice board to vary the flow rate to provide the desired rate of draining.

13 Tapered inlet device on pipe inlet to improve flow into pipe and increase flow capacity.

14 Hinge seals between the fixed and rotating components allow free flow downstream of the sluice without significant leaks around moving joints that would increase flow rate above the calculated rate.

15 Horizontal rubber seal between the down stream lip of the fixed portion and the entrance of the flume flexes as the flume rotates downward, smoothing flow into the flume and sealing the horizontal connection between the two components.

16 Sluice gate opening can be larger than conventional outlet orifices while allowing the required flow rate through it because of the lower head which reduces the potential for clogging.

17 Device's flow rate characteristics can have the advantage of reducing the required storage volume in a basin and permitting the allowable depth to be increased to provide the same volume that takes up less horizontal space, making the basin more compact.

18 Float acts to contain surface debris and prevent clogging the device and restricting the flow of water through the device.

19 Screens provided upstream of sluice catches debris and keeps it away from the control opening, to prevent clogging of the opening and reducing outflow.

20 Constructed of material resistant to degrading under ultraviolet radiation.

21 Dark materials used in construction absorbs heat from the sun to create a microclimate to prevent or thaw ice in winter and allow device to continue to drain and move up and down.

22 Wide and deep horizontal footprint and significant mass provide a balanced, stable platform to keep sluice level with a constant head so that it is self-compensating as it floats up and down with a changing water level, producing a known flow rate.

23 Internal ballast.

Embodiments of the disclosed device provide a novel floating surface drain or skimmer to regulate the filling and draining of a stormwater impoundment pond or structure, for example, a stormwater detention basin or a sedimentation basin. The inlet portion of the device with flow rate controlling sluice gate is attached to a float device that supports it just below the surface at a fixed depth. This provides a known head on the sluice gate orifice, providing a known, near constant flow rate from the device and through most of the vertical range of its movement as the basin fills and drains. The height of the sluice gate is adjustable to vary the flow rate and customize the outflow rate according to the requirements of the particular installation of the device. The upper portion of the float protrudes above the water surface and acts as a trash guard to capture debris floating on the water surface and keep it away from the sluice gate and prevent clogging. In addition, the frame has slots cut in the material to allow water in but keep debris out. The outlet section downstream of the sluice gate, consisting of an enclosed tapering flume, can rotate downward as the water level in the basin rises in response to stormwater runoff flowing in and being stored. Stored water flows out at a determined rate controlled by the sluice gate. To allow this rotation the flume section is connected to the fixed frame on the downstream side by means of hinges and seals so that only water flowing through the sluice gate is released. The hinge/seals have sliding parallel vertical plates tightly fitted to form a nearly watertight seal while rotating. The flume tapers into a circular pipe that drains the water out of the basin. The flume is provided with a tapered inlet into the pipe to improve the efficiency of flow entering the pipe. The pipe length may vary according to the depth of the basin or structure where the device is installed and is long enough to allow the range of vertical movement required without exceeding a maximum slope on the pipe. The lower end of the pipe has a length of flexible hose secured to it with standard fittings and clamps to provide a hinge that allows the device to float up and down as the basin fills and drains and the depth increases. This hose connects the device to a conventional pipe or outlet structure that drains the basin. The device is constructed of material resistant to deterioration from sunlight so that it can be used in permanent installations. The dark material used absorbs heat from the sun, potentially creating a microclimate, so the device is less likely to freeze and clog or be trapped in ice. The device can be constructed in different sizes to provide a range of flow rates as needed for stormwater facilities of various sizes. The device could be used in unique situations where controlling the flow of water at a known and constant rate from near the surface is needed but not anticipated or described in this patent application.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which:

FIG. 15 is a perspective view of a portion of a water management device, according to an exemplary embodiment.

DETAILED DESCRIPTION

Referring generally to the figures, various embodiments of a drainage device are shown. This disclosure provides a novel floating surface drain or skimmer to regulate the filling and draining of a stormwater impoundment pond or structure, for example, a stormwater detention basin or a sedimentation basin.

Figure 1:
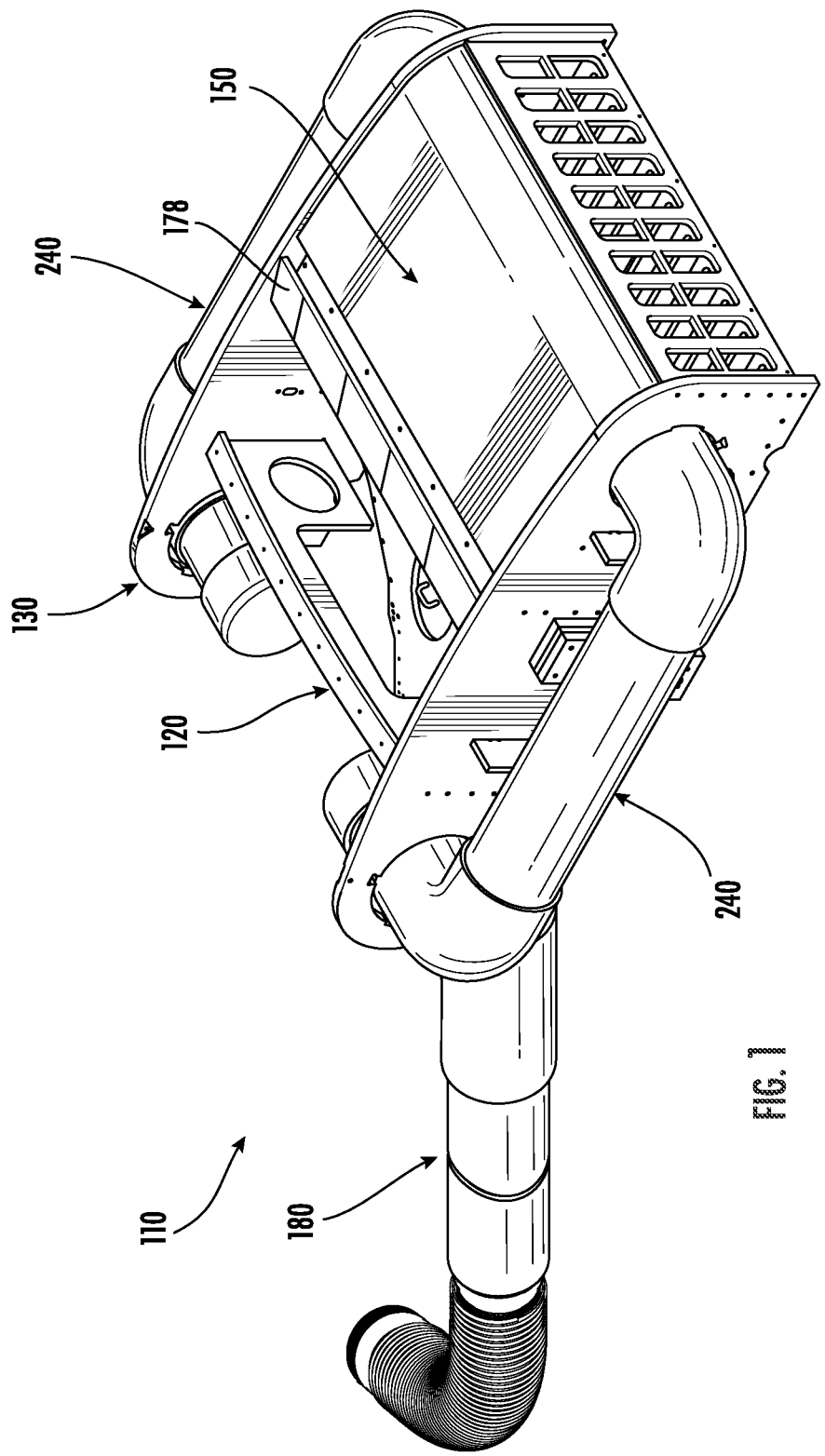
FIG. 1 is a perspective view of a water management device, according to an exemplary embodiment.
Figure 2:
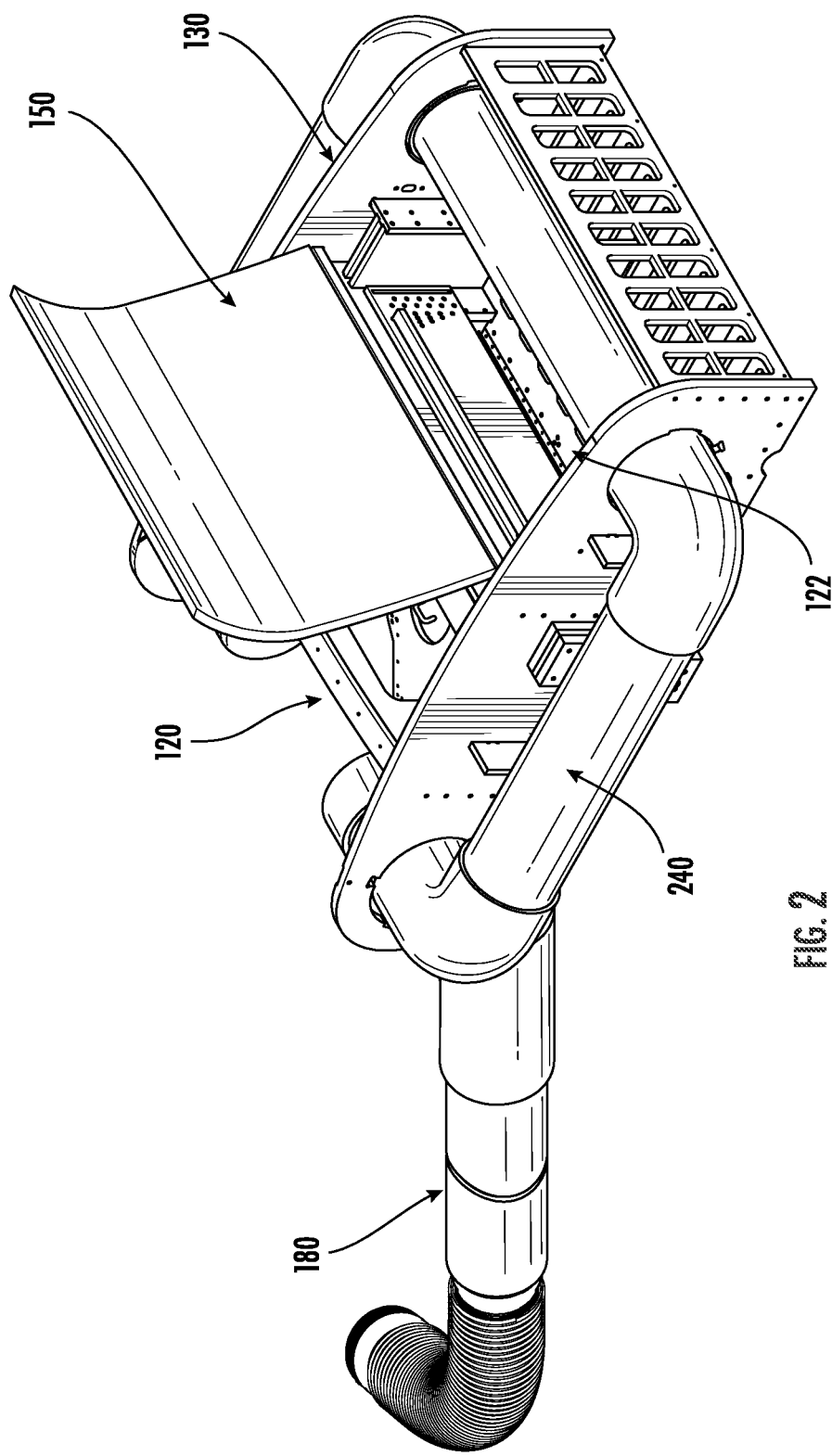
FIG. 2 is a perspective view of the water management device of FIG. 1, according to an exemplary embodiment.
Figure 3:
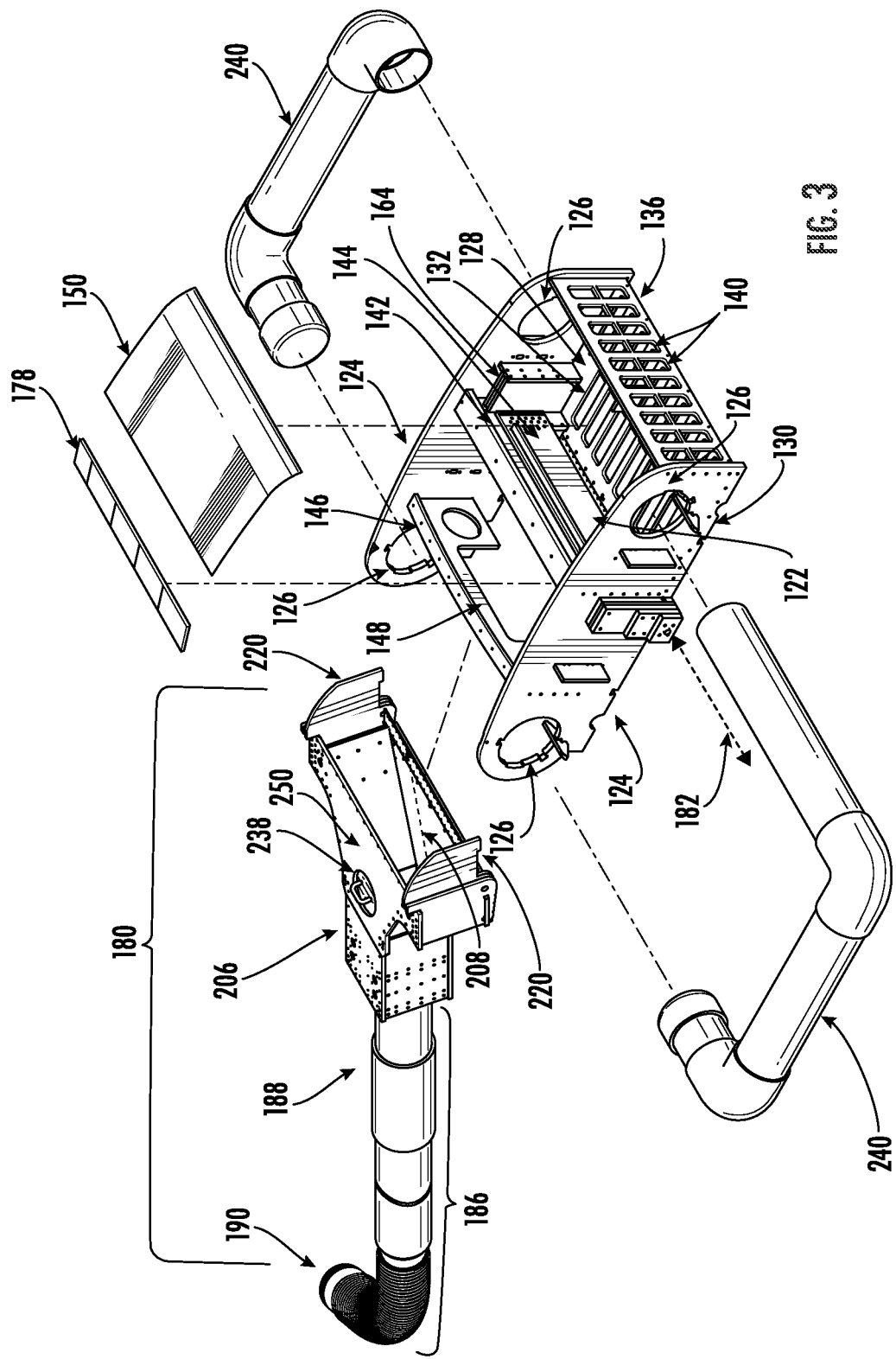
FIG. 3 is an exploded perspective view of the water management device of FIG. 1, according to an exemplary embodiment.
Figure 4:
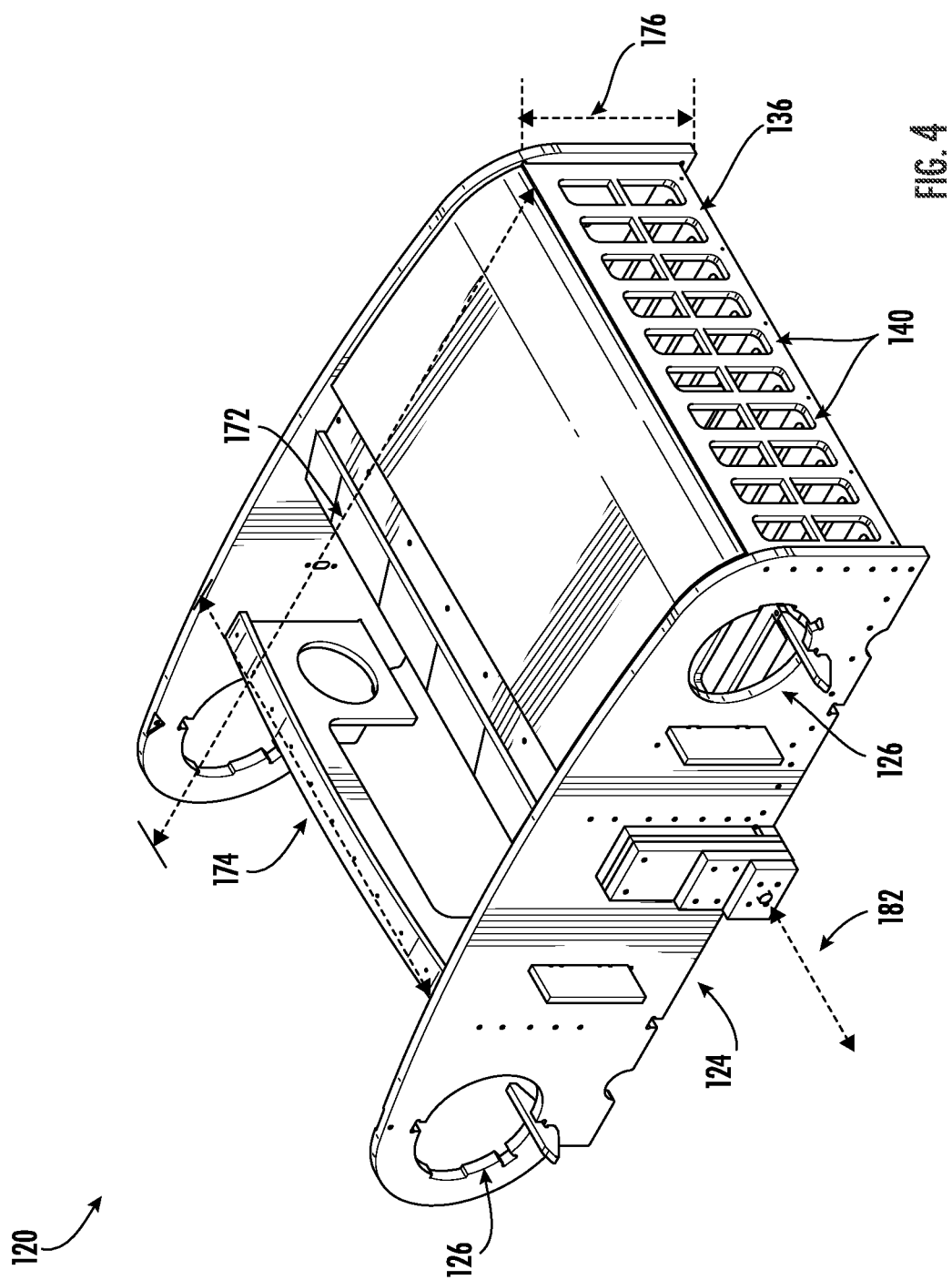
FIG. 4 is an exploded perspective view of a portion of the water management device of FIG. 1, according to an exemplary embodiment.

Referring to FIGS. 1-3, a drainage device, shown as water management device 110, is shown according to an exemplary embodiment. Water management device 110 is configured to drain water, such as by draining water from a stormwater basin (e.g., an area configured to collect water drainage from a storm). In various embodiments, water management device 110 comprises a skimmer configured to drain water from a water collection area.

In various embodiments, water management device 110 includes sluice 120, a drainage element, shown as flume 180, and a buoyancy device, shown as float 240. In various embodiments, cover 150 encloses chamber 122 and cover 150 is coupled to housing 130 of sluice 120, such as pivotally coupled to housing 130 and/or side plates 124. In various embodiments, housing 130 of sluice 120 defines chamber 122, and cover 150 pivotally actuates to expose and/or cover chamber 122, such as by cover 150 being pivotally coupled to one or more of side plates 124 and/or front wall 142.

Referring to FIG. 3 in particular, flume 180 includes a drainage channel, shown as pipe 186. In various embodiments, pipe 186 includes a tube, such as a cylindrical tube. Flume 180 extends away from the inlet 206, such as via the drainage channel, and the channel is configured to receive the water from sluice 120. In use, flume 180 drains water to an outlet, such as a stormwater drain. In various embodiments, pipe 186 includes a fixed portion 188 and a flexible portion 190. Broadly speaking, inlet 206 of flume 180 is coupled to and interfaces against sluice 120. Similar to the cover 150 of sluice 120, inlet 206 includes an openable hatch 238. In various embodiments, hatch 238 is detachably coupled and/or pivotally coupled to cover 250 of inlet 206. Hatch 238 includes a handle, shown as a loop, configured to facilitate detaching hatch 238 from cover 250 (e.g., if a user wants to reach inside inlet 206 to remove debris). In various embodiments, cover 250 and/or hatch 238 is transparent and/or mostly transparent, to facilitate observing debris collecting in inlet 206. In various embodiments, lid 178 extends above the coupling of flume 180 to sluice 120.

In various embodiments, inlet 206 is a tapered inlet extending along a longitudinal axis 208. Inlet 206 includes an input 210 disposed against the opening 152 of the front wall 142, an output 214 opposite the input 210, and sidewalls 194 extending between the input 210 and the output 214.

In various embodiments flume 180 is pivotably coupled to sluice 120 and pivots with respect to sluice 120 about axis 182. Flume 180 is configured to receive the water exiting the chamber 122 and direct the water away from the sluice 120. As flume 180 pivots with respect to sluice 120, inlet 206 actuates into and out of opening 148 in outer wall 146 of the sluice 120. For example, as the water to be drained lowers, flume 180 pivots upward with respect to sluice 120 such that flume 180 extends at least partially through opening 148. When water enters the stormwater pond, the sluice 120 rises with the water and correspondingly flume 180 pivots to extend downward from sluice 120 until flume 180 partially or completely exits opening 148.

In various embodiments, extensions 220 extend from inlet 206. Extensions 220 are configured to be received between plates 164 within chamber 122. For example, in various embodiments water management device 110 includes two plates 164 on each side of opening 140, and an extension 220 is received between the two plates 164. The friction fit between the plates 164 and extensions 220 provides a seal with a limited amount of water exiting chamber 122 via any space between the plates 164 and extensions 220.

Sluice 120 includes one or more coupling components to couple with float 240, such as openings 126 through which float 240 extends. In various embodiments, openings 126 are defined by side plates 124. In various embodiments, float 240 extends through the chamber 122.

Sluice 120 is configured to receive liquid, such as water, that water management device 110 is positioned within. Sluice 120 includes a chamber 122 that receives the water. In various embodiments, chamber 122 is defined by one or more of bottom wall 128, front wall 142, front plate 144, rear wall 136, and top cover 150.

Housing 130 includes a plurality of openings configured to permit the water outside the sluice 120 to enter the chamber 122. In various embodiments, water enters chamber 122 via openings 132 in bottom wall 128 and/or openings 140 in rear wall 136. In various embodiments, bottom wall 128 includes a first subset of the plurality of openings to chamber 122, and rear wall 136 includes a second subset of the plurality of openings. In various embodiments, the first subset of the plurality of openings are distinct from the second subset of the plurality of openings.

Sluice 120 defines a width 174, a length 172, and a height 176. In various embodiments, sluice 120 defines a wide footprint to facilitate sluice 120 maintaining a nearly constant orientation thereby resulting in a more controlled and/or even flow of water through sluice 120. For example, the footprint of sluice 120 can be considered to be length 172 times width 174, and a ratio of (length 172 times width 174) to height 176 is between 10:1 to 50:1, and more specifically between 15:1 and 40:1, and more specifically between 20:1 and 30:1. As another example, the footprint of sluice 120 can be considered to be length 172 times width 174, and a ratio of (length 172 times width 174) to height 176 is at least 10:1, and more specifically at least 15:1, and more specifically at least 20:1, and even more specifically at least 25:1. As noted above, Applicant has observed that sluice 120 defining a relatively large footprint improves the flow characteristics of water flowing through sluice 120.

Figure 5:
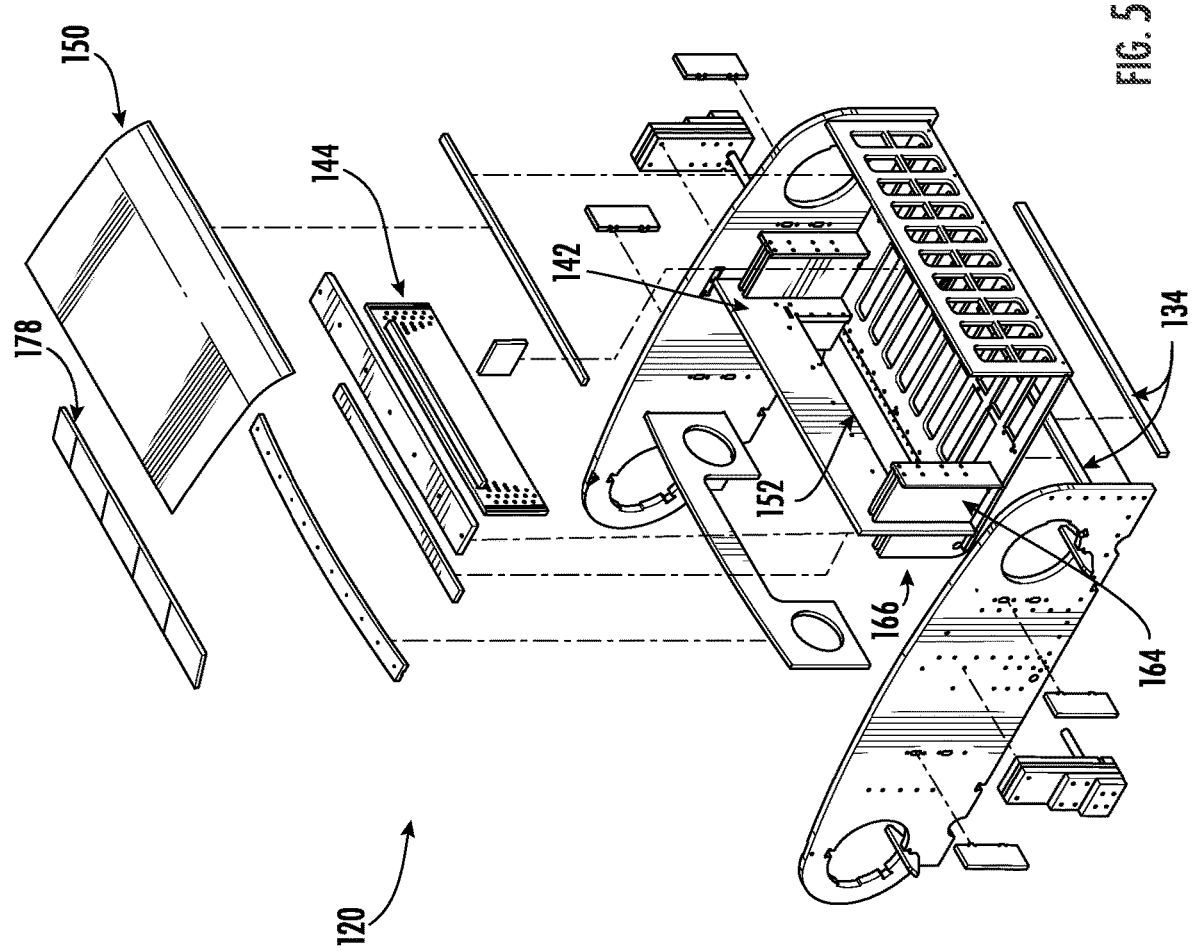
FIG. 5 is a perspective view of a portion of the water management device of FIG. 1, according to an exemplary embodiment.

Referring to FIG. 5, sluice 120 includes inner end plates 164 and outer end plates 166. Flume 180 extends away from the inlet 206, such as via the drainage channel, and the channel is configured to receive the water from opening 152 in the front wall 142 via the tapered inlet 206 and direct the water away from the sluice 120. As will be explained, in various embodiments portions of flume 180 interface with inner end plates 164 and outer end plates 166 to maintain a seal between flume 180 and inner end plates 164 and outer end plates 166. In various embodiments the seal between flume 180, inner end plates 164 and outer end plates 166 is nearly watertight. For example, a small amount of water is permitted to penetrate the seal, but given the interface between flume 180 and the plates, the amount of water penetrating the seal is very limited as compared to the amount of water entering chamber 122 via the openings.

In various embodiments, sluice 120 includes one or more support elements, shown as ribs 134. Ribs 134 provides structural support to sluice 120, such as to a bottom wall of sluice 120.

Figure 6:
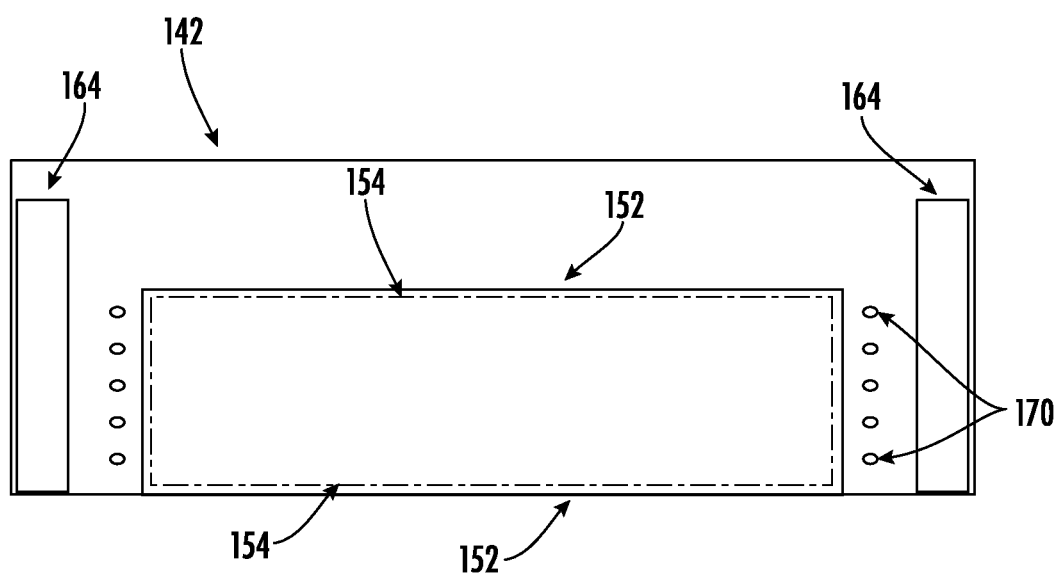
FIG. 6 is a rear view of a portion of the water management device of FIG. 1, according to an exemplary embodiment.
Figure 7:
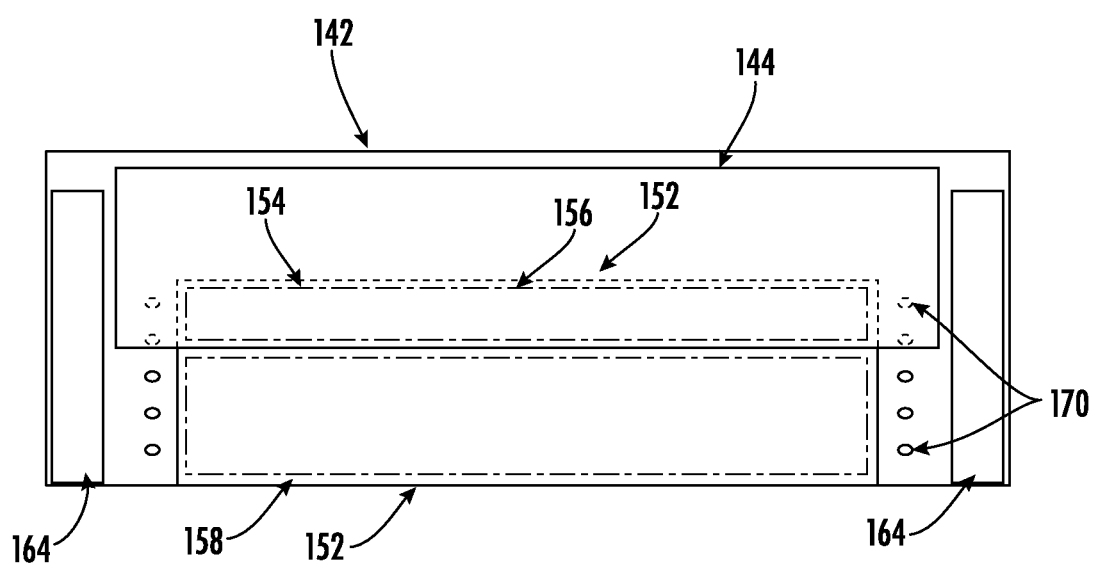
FIG. 7 is a rear view of a portion of the water management device of FIG. 1, according to an exemplary embodiment.
Figure 8:
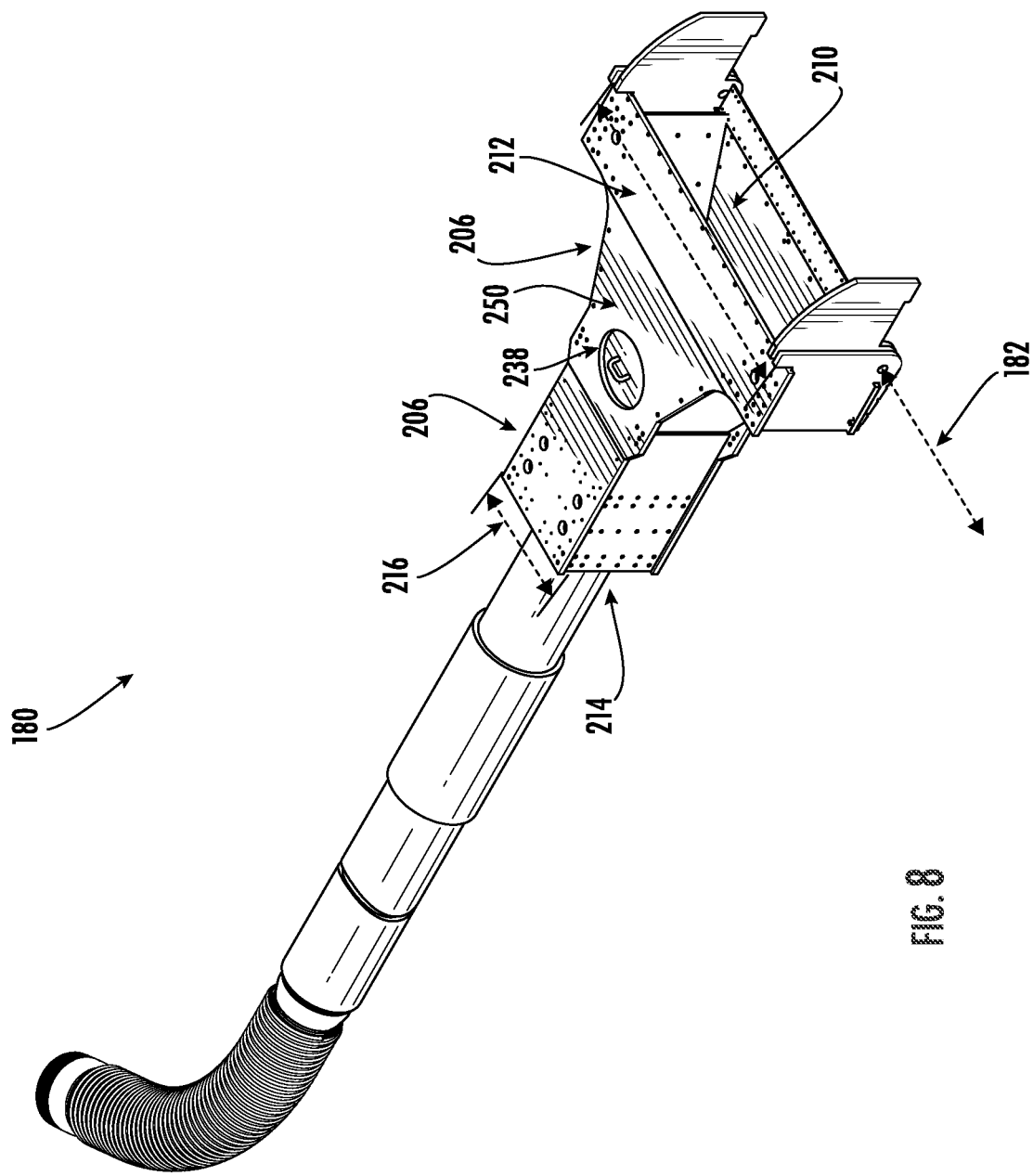
FIG. 8 is a perspective view of a portion of the water management device of FIG. 1, according to an exemplary embodiment.

Referring to FIGS. 5-7, various aspects of sluice 120 are shown. Front wall 142 defines a front of the chamber 122, and the front wall 142 defines an opening 152 configured to permit the water to exit the chamber 122. In various embodiments, front plate 144 is slidable with respect to front wall 142. For example, front plate 144 can be coupled to front wall 142 at various heights, thereby changing the size of the unobstructed portion of opening 152 in front wall 142.

Referring to FIGS. 6-7 in particular, front plate 144 is repositionable with respect to front wall 142 to adjust the unobstructed area 158 of opening 152. For example, front plate 144 may be coupled to front wall 142 at various heights via coupling front wall 144 to one or more of apertures 170 that are positioned at multiple heights within front wall 144. As will be explained, the front plate 144 is configured to be selectively coupled to the front wall 142 at a plurality of locations that each result in the front plate 144 providing a different degree of obstruction to the opening of the front wall.

When front plate 144 is not positioned in front of opening 152, the unobstructed area 158 of opening 152 is the entire area 154 of opening 152 (FIG. 6). When front plate 144 is positioned in front of opening 152, the entire area 154 of opening 152 includes both an unobstructed area 158 and an obstructed area 156 (FIG. 7) thereby limiting the amount of water that is permitted to flow through opening 152. In various embodiments front plate 144 can be positioned with respect to front wall 142 such that various percentages of entire area 154 are obstructed by front plate 144. To provide several non-limiting examples, entire area 154 can be 10% covered, 20% covered, 30% covered, 40% covered, and/or 50% covered.

Referring to FIGS. 8-11, various aspects of flume 180 are shown. Input 210 of inlet 206 receives water from sluice 120, and output 214 of inlet 206 releases water into inlet 192 of the pipe, which exits pipe at outlet 222. Input 210 defines width 212 perpendicular to the longitudinal axis 208 of inlet 206, and output 214 defines width 216 perpendicular to the longitudinal axis 208 of inlet 206. In various embodiments, the input 210 of the inlet 206 defines a first horizontal width 212 and the output 214 of the inlet 206 defines a second horizontal width 216 less than the first horizontal width 212. Similar to the cover 150 of sluice 120, inlet 206 includes an openable hatch 238 detachably coupled to cover 250 of inlet 206.

In various embodiments inlet 206 includes a sealing element, shown as rubber seal 196, extending from a front and bottom of inlet 206. In various embodiments, seal 196 is formed from a material more compressible than other portions of inlet 206, such as sidewalls 194. In various embodiments inlet 206 includes one or more coupling components, shown as pipe collars 200, that couple inlet 206 to the pipe. Inlet 206 includes protrusions 202 and/or extensions 220 that extend from sidewalls 194.

In various embodiments, extensions 220 are coupled to the sidewalls 194 of the flume 180 and extensions 220 extend past the front wall 142 and/or into the chamber 122. In various embodiments, sidewalls 194 narrow from the input 210 to the output 214 at an angle 218 with respect to longitudinal axis 208.

Broadly speaking, in various embodiments angle 218 is between 12 and 30 degrees. More specifically, in various embodiments angle 218 is between 10 and 25 degrees, and more specifically between 12 and 20 degrees, and more specifically between 13 and 18 degrees, and even more specifically is 15.5 degrees. In various other embodiments, angle 218 is between 20 and 35 degrees, and more specifically between 25 and 30 degrees, and even more specifically is 27.5 degrees. Applicant has observed that one or more of these angles improves the flow characteristics of water transiting through inlet 206.

Figure 9:
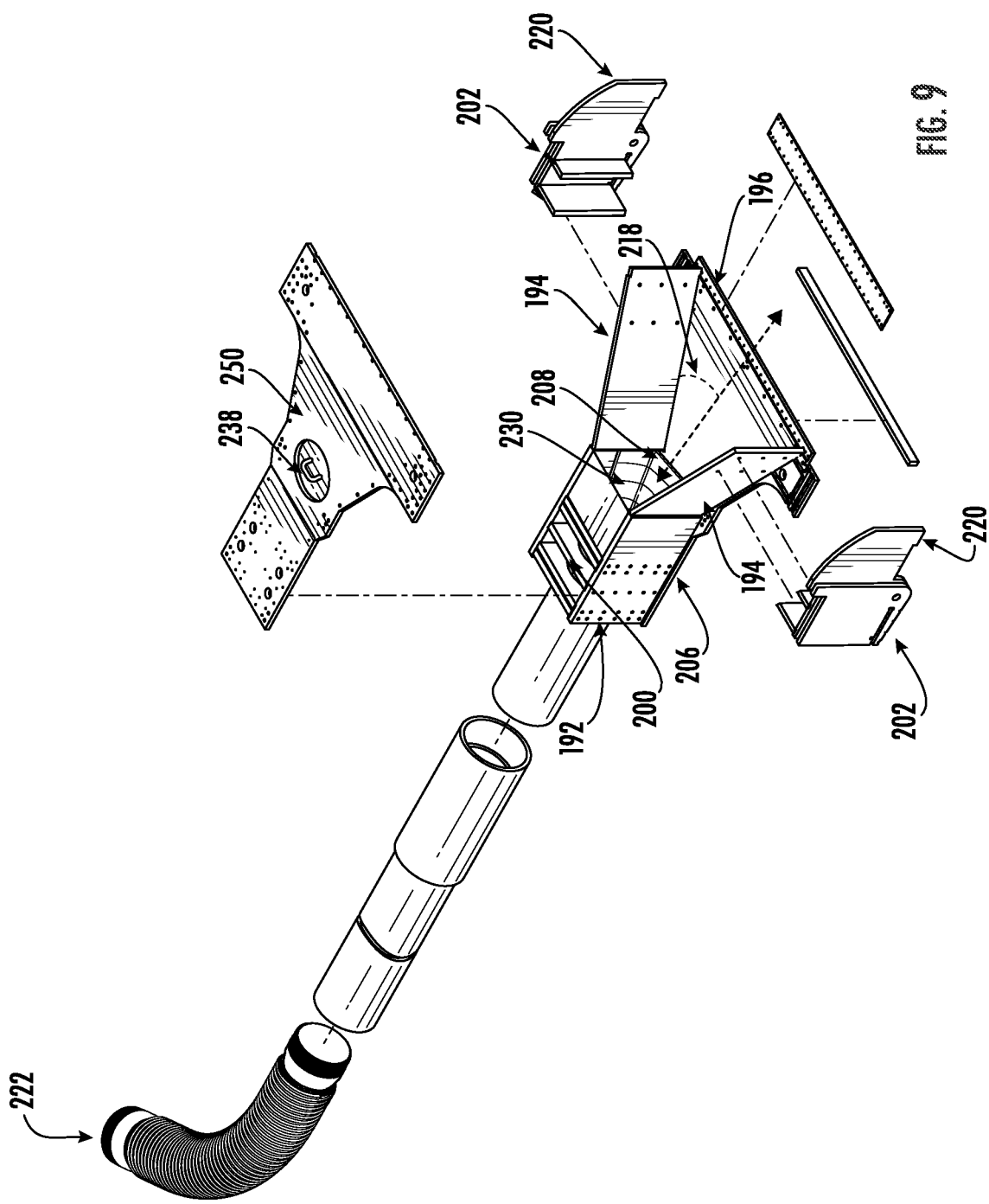
FIG. 9 is an exploded perspective view of a portion of the water management device of FIG. 1, according to an exemplary embodiment.
Figure 10:
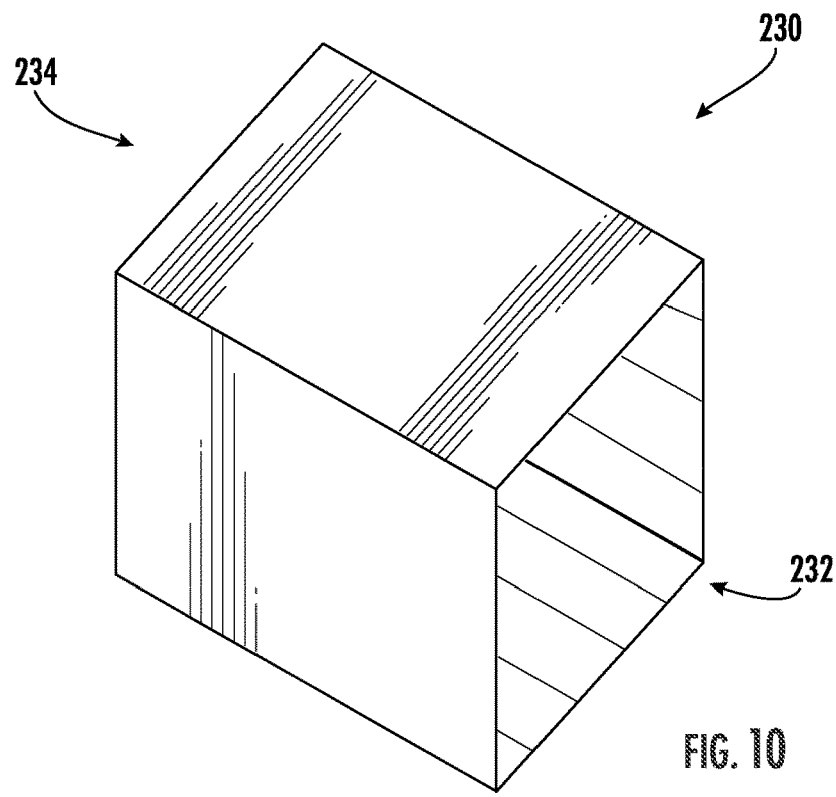
FIG. 10 is a detailed perspective view of a portion of the water management device of FIG. 1, according to an exemplary embodiment.
Figure 11:
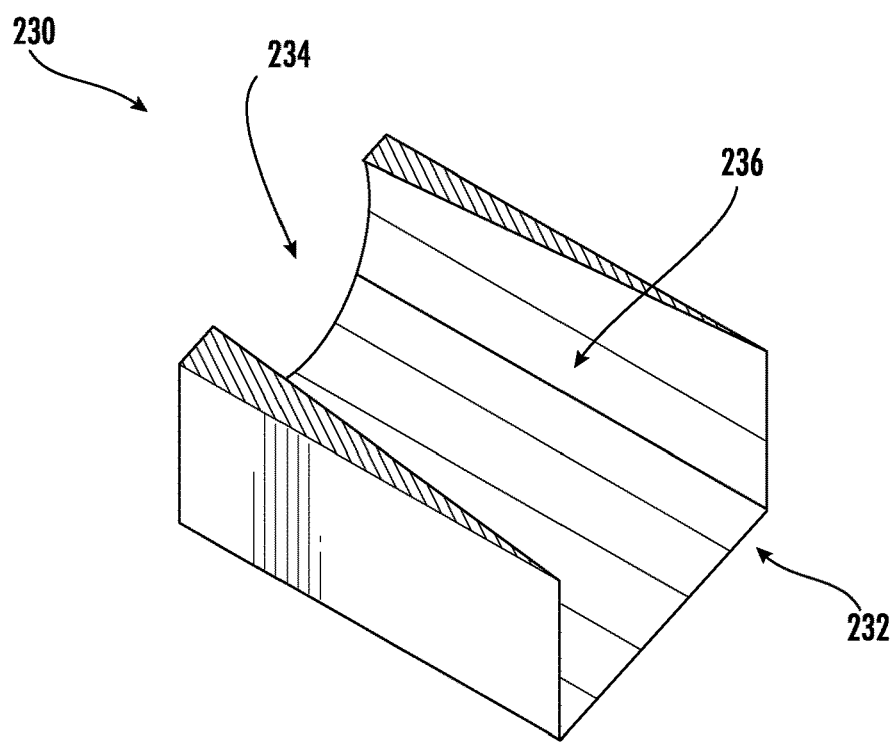
FIG. 11 is a detailed perspective cross-section view of the portion of the water management device of FIG. 10, according to an exemplary embodiment.

Referring to FIGS. 9-11 in particular, in various embodiments inlet 206 includes tapered collar 230. FIG. 11 depicts a perspective cross-section view of the lower-half of tapered collar 230 so that aspects of the interior channel of tapered collar 230 can be seen.

As can be seen, tapered collar 230 includes a rectangular input 232 that transitions into a rounded output 234. In various embodiments, tapered collar 230 smoothly transitions via middle portion 236 from the input 232 to the output 234. In various embodiments, the middle portion 236 of tapered collar 230 provides a linear and/or smooth transition from the input 232 to the output 234. For example, in various embodiments as water moves across tapered collar 230 from the input 232 to the output 234, the middle portion 236 of tapered collar 230 provides a smooth surface without edges or corners, thereby facilitating the fluid flow of the water from a horizontal cross-section (at inlet 206) to the circular cross-section of the pipe. Applicant has observed that this profile for tapered collar 230 provides improved fluid flow dynamics for the water. For example, Applicant has observed tapered collar 230 providing a less turbulent transition of the water into the pipe compared to other structures.

In various embodiments, the smooth transition of the tapered collar 230 defines a linear transition. For example, the surface of tapered collar 230 transitions from the input to the output such that for any given path along tapered collar 230 from input to the output, the diameter of each path from the center of tapered collar 230 changes at a constant rate as the water moves from the input to the output.

Figure 12:
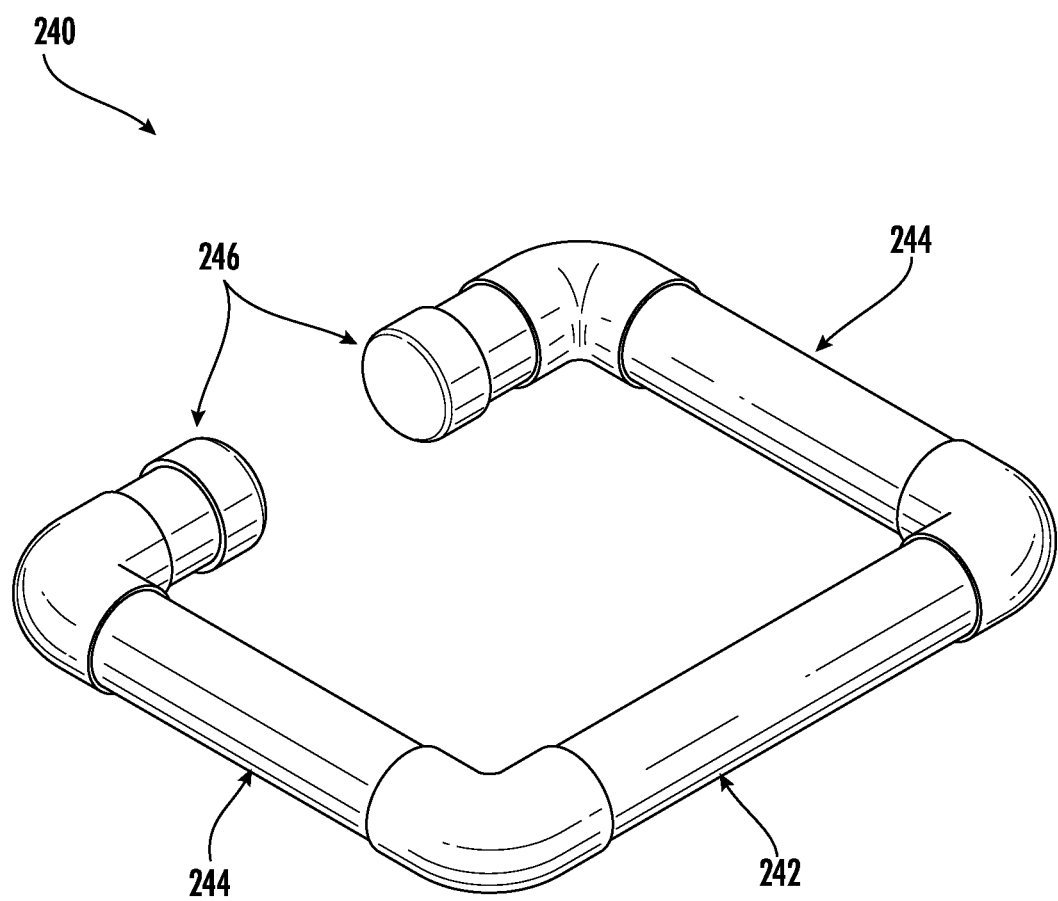
FIG. 12 is a perspective view of a portion of the water management device of FIG. 1, according to an exemplary embodiment.
Figure 13:
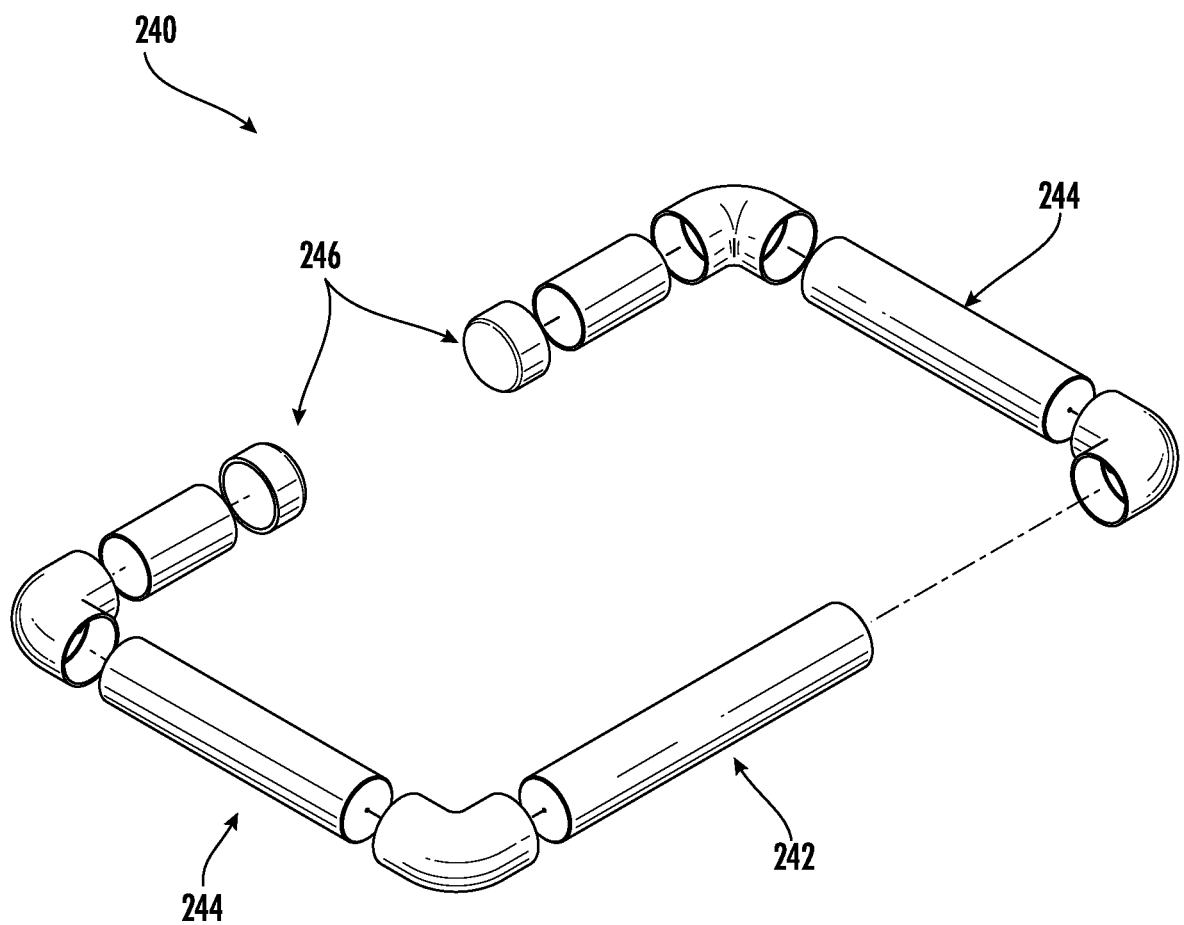
FIG. 13 is an exploded perspective view of a portion of the water management device of FIG. 1, according to an exemplary embodiment.
Figure 14:
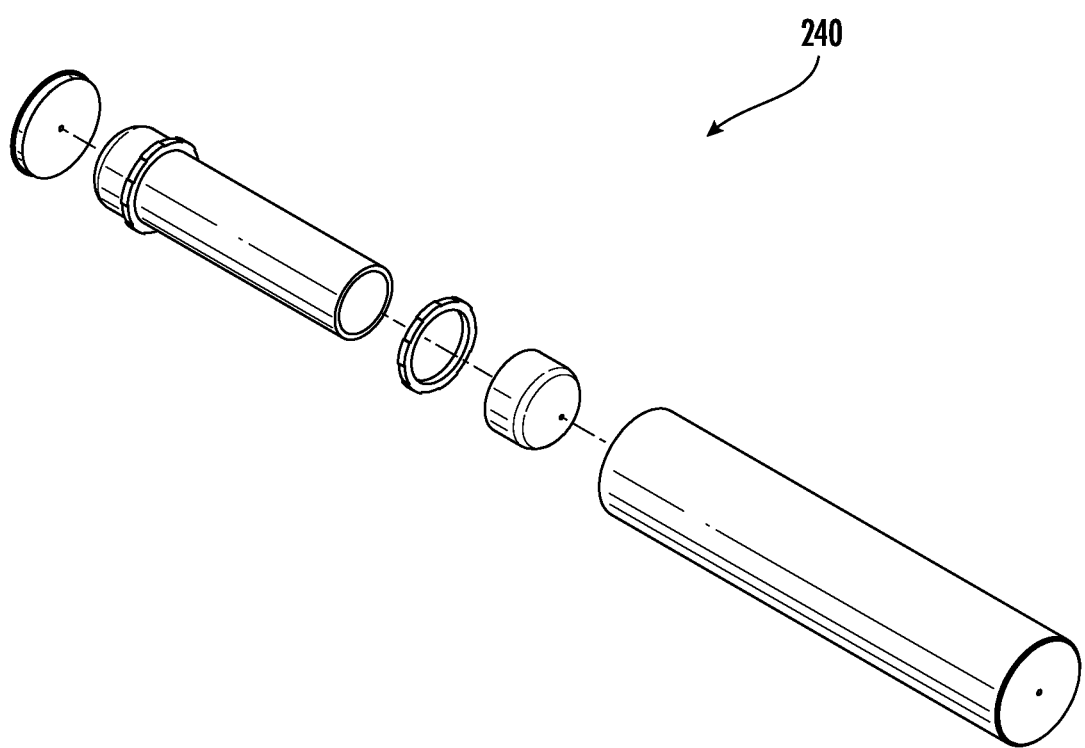
FIG. 14 is an exploded perspective view of a portion of the water management device of FIG. 1, according to an exemplary embodiment.

Referring to FIGS. 12-14, various aspects of float 240 are shown. Float 240 is coupled to the sluice 120, and float 240 is configured to bias the sluice 120 towards a top of the water. In various embodiments float 240 includes rear arm 242 extending between side arms 244. Front arms 246 extend from side arms 244 towards each other, such as partially towards each other. In various embodiments the gap between front arms 246 provides a space for flume 180 to actuate into and out of as the water level of the stormwater pond raises and lowers. In one or more embodiments, the arms 242, 244, 246 of the float 240 define a continuous hollow tube sealed at each end and filled with a buoyant fluid, such as air. In one or more embodiments, the arms 242, 244, 246 are made of a buoyant material, such as various foam materials or cork.

In various embodiments, float 240 includes a ballast element. For example, the portion of float 240 that extends past the rear of water management device 110 includes ballast. This ballast counteracts the lack of floatation on the front of water management device 110 above flume 180.

Referring to FIG. 15, water management device 610 is shown according to an exemplary embodiment. Water management device 610 is substantially the same as water management device 110 except for the differences discussed herein. In particular, water management device 610 includes a vent 612 that extends upwards from flume 680. Vent 612 provides fluid communication between the flume and ambient air above the water being drained.

Still referring to FIG. 15, it will be understood that objects in water management device 610 that are similar and/or the same as objects in water management device 110 are given similar reference numbers plus five hundred. For example, sluice 620 of water management device 610 is similar and/or the same as sluice 120 of water management device 110.

Various aspects of various embodiments are described in detail below.

In one or more embodiments, the water management device 110 provides a unique floating surface drain device, commonly known as a skimmer, used to control the filling and draining of a stormwater basin or other type of impoundment and to release the cleanest water in the basin from near the water surface at a desired and known rate.

In embodiments, the device can be used in place of and as an improvement to conventional stormwater basin outlets located near the bottom of the basin. Such conventional basin outlets have a variable head on the controlling orifice and, consequently, a variable flow rate as the basin's water level rises and falls, resulting in undesirable flow characteristics that fails to adequately control stormwater discharge and achieve the purpose of the basin to control flooding and pollution.

In embodiments, the floating surface drain device's flow control features may allow for a reduction in the required storage volume in a basin and permit the allowable depth to be increased. In this way, the same volume is provided but takes up less horizontal space, making the basin more compact.

The design incorporates a unique configuration of the flow controlling orifice, a sluice gate, and outlet feature, that is a flume, that has numerous advantages over existing designs in that the orifice can be larger, have a high flow capacity, and is less likely to clog. Novel configuration of the float and location of the sluice opening and flume leading to the pipe barrel inlet maintains a nearly uniform head on the controlling sluice orifice providing a uniform draining and release rate of flow.

Float provided with balanced buoyancy and ballast to keep the inlet on the water surface as the basin fills and drains and keep the sluice gate suspended under the water surface at a known, nearly constant depth to provide a known, constant rate of flow.

Frame engages and is attached to the float so that there are no holes in the float that could cause leaks.

Wide, low positioned sluice gate/orifice design allows full flow rate soon after the basin begins to fill, potentially reducing required storage volume in the basin.

Simple, gravity flow operation of water through screens (e.g., openings 132 and/or openings 140), into the sluice opening into the Flume and Pipe barrel requiring no connection to a power source.

Provision for adjusting the height of the Sluice to vary the flow rate, customizing the flow rate as needed to meet the filling and draining requirements of the particular installation.

Sluice gate height can be varied using an adjustable sluice board (e.g, front plate 144) to cover part of the top of the sluice to a known height giving a certain flow based on testing to control the flow rate to provide the desired rate of draining.

Tapered inlet improvement device on the pipe inlet (e.g., tapered collar 230) to improve transition of flow into the pipe and to maximize the pipe's flow capacity, which reduces the pipe's diameter and the buoyancy it creates.

Hinge seals provided between the fixed component, the sluice and rotating components, the Flume and Pipe Barrel, allow free flow downstream of the sluice opening without significant leaks around moving joints that would significantly increase flow rate above the calculated rate.

Horizontal rubber seal (e.g., seal 196) provided between the down stream lip of the fixed portion and the entrance of the rotating Flume flexes as the Flume rotates downward while the skimmer rises, smoothing flow into the flume and sealing the horizontal connection between the two components.

Sluice gate opening (e.g., openings 132 and/or openings 140) can have larger dimensions than conventional outlet orifices because the device floats on the water surface, rising and falling as the basin fills and drains providing a low head on the opening by placing it just below the water surface while allowing the required flow rate through it.

Device is provided with a large opening on the sluice to reduce the potential for clogging with debris which is possible because the design allows the opening to be close to the water surface with a low head on the opening.

Device's flow controlling characteristics of high flow rate at the beginning of the basin's filling can have the advantage of reducing the required storage volume in a basin and permitting the allowable depth to be increased to provide the same volume that takes up less horizontal space, making the basin more compact.

Float (e.g., float 240) protruding above the water surface acts to contain surface debris and prevent clogging the device and restricting the flow of water through the device.

Float suspends sluice inlet (e.g., openings 132) below the water surface and acts to contain surface debris and prevent clogging the device and restricting the flow of water through the device.

Screens provided on the Side Plates and Bottom Screen upstream of Sluice catch debris and keep it away from the control opening, to prevent clogging of the sluice opening and the pipe below.

Constructed of material resistant to degrading by ultraviolet radiation for long life in exposed installations.

Dark materials are used in construction and are intended to absorb heat from sunlight to create a microclimate during cold weather around the device to prevent ice that would impede flow through it or prevent it floating up and down.

Wide horizontal footprint and significant mass provide a balanced, stable platform to keep the sluice level with a nearly constant head so that it is self-compensating as it floats up and down with a changing water level, producing a known flow rate.

Internal ballast provided inside the Float to counter the upward force of buoyancy when the flume and pipe barrel are under water and partially empty.

Additional weight is placed and secured within the sides and rear pipes forming the Float to provide ballast that counter acts the buoyancy created when the Flume and Pipe Barrel are less than completely full of water.

Ballast is secured by spacers over the ballast pipes that fit snuggly into the inside of the float pipes and by caps on the ends of the pipe.

The ballast is secured inside the Float by end caps to prevent it shifting during use and affecting the balance of the device.

Lids cover openings necessary for inspection and maintenance to keep falling debris out and critters that may block clog the device.

The front lid (e.g., lid 178) covers and partially seals the gap formed between Sluice and Flume inlet when the Flume rotates downward acts as a muffler to reduce noise that might cause an undesirable disturbance in some installations caused by the suction of water and air into the pipe inlet.

An Inspection Hatch (e.g., hatch 238) on Flume (e.g., flume 180) allows access to inspect for clogging at the pipe inlet and clearing if necessary.

Integral Frame and Sluice secure Flume, and Float ties it all together.

Vanes below Sluice channel flow into tapered Flume to allow flow to be concentrated deeper and faster in preparation to enter funnel and pipe.

Tapered Flume (e.g., tapered collar 230) concentrates and deepens shallow flow through Sluice into deeper flow to transition into the Funnel and Pipe inlet.

Pivot Rods are located near the center of gravity of the Float and Frame so that buoyance created by pipe barrel is counted by weight of float and frame.

Pivot Rods supported by blocks that support outer ends of Rods beyond the outside edge of the Side Plates to provide a strong support for the Flume to pivot on.

Pipe Collars connect the round pipe to the square end of the Flume.

Fasteners through the Flume Top and Flume Bottom, through the edge of the Pipe Collars and into the sides of the Pipe securely connect the Pipe to the Flume.

In various figures, the apparatus is depicted in a raised position as if it were floating on the water surface and as if the lower, left end of the flexible hose (with respect to the orientation of the figures) were attached to an outlet lower that the water surface. In one or more embodiments, the float and pipe are made out of standard plastic pipe and fittings. The float is sealed to make a watertight buoyant unit. In embodiments, the flexible hose at the lower, outlet end of the pipe-barrel may be standard suction hose with threaded stainless-steel fittings secured with clamps and attached to the pipe-barrel with standard fittings. The lower, outlet end of the hose would be securely attached to the outlet drain of the basin. In embodiments, the other components are made of ultraviolet resistant marine grade plastic. In one or more such embodiments, the plastic sheet may be cut into shapes using CNC machines for accurate assembly. In one or more embodiments, the various pieces are secured to adjacent pieces using standard screws and bolts and plastic welding as appropriate.

In various embodiments, various aspects are fabricated from sheets of marine grade plastic cut into the shapes shown on a CNC cutter.

In various embodiments, the sluice includes the vertical left and right Side Plates with holes at each corner for the Float components to fit into and connect to the Frame-Sluice. Four Side Plate Float-Spacers are shown on the outside of each Side Plate to keep the Frame-Sluice centered in the Float. The horizontal Bottom Screen and vertical Rear Screen are shown connected and attached to the Side Plate and will attach to the other side. The vertical Sluice Gate Plate is attached to the Bottom Screen and both Side Plates. The Sluice Gate Plate Brace is a flange attached to the top edge of the Sluice Gate Plate and each end is attached to the Side Plates also. Sluice Gate Rib is attached on the backside near the top. The Sluice Outlet Vanes on the downstream side of the Sluice direct the momentum of the flow through the Sluice into the Flume downstream of the Sluice. The Bottom Screen Rib Medium and Bottom Screen Rib Long are attached under the Bottom Screen to stiffen it. The two Sluice Seal-Hinges are fitted into vertical slots at either end of the Sluice Gate Plate and attached to the Bottom Screen. Two Sluice Seal-Hinge End Plates cover the rear opening between the two Sluice Seal-Hinges. Rod Support Stacks are composed of five pieces of material to give the required thickness, on the outside of each Side Plate. Holes through these stacks of pieces match up with holes on the Side Plates and the Sluice Seal Hinges on both ends of the Sluice Gate Plate when assembled. The two Rods will pass through these holes and corresponding holes on the Flume assembly hinges when it is attached. The Rods are secured with caps on the outside of the Rod Stacks. The outer horizontal and vertical edges of the assembled Bottom Screen, Rear Screen, Sluice Gate Plate and Sluice Seal Hinges fit into slots on the Side Plates and these edges are fastened to the Side Plates to form the completed Frame-Sluice. Side Plate Assembly Aids are used during final assembly of the Float onto the Frame-Sluice to guide the components together and prevent the pipe elbows catching on the edges of the holes when inserted. The Sluice Gate Board with its Lifting Rib that will partially cover the Sluice opening to vary the flow rate. The Side Plates Front Connector with the Top ties the front of the Side Plates together. In various embodiments, there are 2 horizontal lids on the top of the Frame-Sluice, one on each side of the Sluice Gate Plate.

In various embodiments, the Flume components attach to the hinges on the Frame-Sluice and connect sequentially to the Pipe Barrel and Flex Hose assembly. The Inlet V-Flume Bottom has a lip on the wide end for attaching a rubber seal that will attach to and connect the Flume to the adjacent edge of the Bottom Screen when the assembled Flume and the Frame Sluice are joined at the hinges. The bottom has slots on the upper side for the edges of the vertical components to fit into for fastening. The V-Flume Side is attached to the left side of the Inlet V-Flume Bottom and the right V-Flume Side is shown also. The Flume Hinge-Wings With Rib is attached to both sides of the Inlet V-Flume Bottom. The arced shaped ends will fit snuggly into the gap between the two parallel Sluice Seal-Hinges on the Sluice Gate Plate forming a close seal when the Flume rotates downward while the Float and Frame-Sluice remain parallel to the water surface. The Flume Hinge on both ends of the Flume Bottom are additional hinges for strengthening the connection. The rod hole on these four hinges will mate with the corresponding rod holes on the hinges on the Sluice Gate Plate and connected with Rods through the holes for attachment and to allow rotation of the Flume. The Rubber Seal-Hinge that is secured to a lip at the wide end of the Inlet V-Flume Bottom and the opposite long edge will be secured into a corresponding lip on the Bottom Screen of the Frame-Sluice. The Flume Pipe is inside the holes on the Pipe Collars in neck of the Flume and is secured by five Pipe Collars to the neck, bottom and top of the Flume. The Tapered Inlet is at the entrance to the pipe that improves the transition of the turbulent flow from the wide end of the flume into the pipe inlet, partially overcoming the pipe inlet's inefficiency. The Inlet V-Flume Barrel Top aligns slots on the bottom side for the top edges of the sides, neck and pipe collars to fit into and be secured creating a sealed unit except for the openings at either end of the Flume. The Flex Hose assembly acts as a hinge allowing the Float end of the apparatus to move up and down with the Float fixed on the surface and the Flume rotating as the water level changes. The Flex Hose is standard suction hose and fittings, the two Hose to Pipe Adapters with threaded ends that will attach to the Pipe Barrel and a drain from the basin (not shown) where the device is installed. A standard PVC coupling is attached to the end of the flume Pipe. The upper end of the Pipe Barrel (shortened in the drawing) is secured into this coupling.

In various embodiments, the Typical Float Section includes three sections that compose the sides and rear of the float but the sides and rear may not be of equal length. The two Front Pipe Sections are of equal length. The four standard plastic 90 degree Elbows are used to connect the five pieces of pipe. The two plastic Pipe End Caps close and seal the front ends of the float. The float is constructed of standard plastic pipe and fittings glued together to create a watertight unit. There are no holes drilled in the Float to ensure long term watertight sealing. The front of the float, with the two short sections of pipe, and the rear of the float, with the long section of pipe, fit through the holes on the ends of the Side Plates. The gap between the end caps on the front of the Float allows the neck of the Flume to rotate to the necessary height without conflicting with the Float.

The Pipe Section is part of the Float, both the rear and sides. A Ballast Tube, such as a plastic pipe of a determined length of a smaller diameter than the Float pipe, will be filled with dry sand to provide needed ballast for stabilizing the apparatus at the desired depth when it is floating. Ballast Caps are on the Ballast Tube to seal the ends and keep the sand contained inside the tube. Ballast Spacers fit over the outside of the Ballast Tube and allow the filled and assembled ballast to fit closely inside the Float pipe. The Ballast Tubes are secured to End Caps at each end of the length of Float pipe to keep the ballast centered and prevent shifting. The ballast is installed in the sides and rear sections of pipe for the float before the pipe is glued in the elbows and end caps.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the device relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A water management device configured to drain water from a stormwater pond, the water management device comprising:
    a sluice comprising:
        a housing defining a chamber, the housing defining a plurality of openings configured to permit the water outside the sluice to enter the chamber; and
        a front wall defining a front of the chamber, the front wall defining an aperture configured to permit the water to exit the chamber;
    a buoyancy device coupled to the sluice, the buoyancy device configured to bias the sluice towards a top of the water; and
    a drainage element pivotably coupled to the sluice, the drainage element configured to receive the water exiting the chamber and direct the water away from the sluice, the drainage element comprising:
        a tapered inlet extending along a longitudinal axis, the tapered inlet comprising an input disposed against the aperture of the front wall, an output opposite the input, and sidewalls extending between the input and the output, wherein the sidewalls narrow from the input to the output at an angle between 12 degrees and 30 degrees with respect to the longitudinal axis; and
        a channel extending away from the tapered inlet, the channel configured to receive the water from the aperture via the tapered inlet and direct the water away from the sluice.

2. The water management device of claim 1, the housing including a bottom wall defining at least part of the chamber, the bottom wall including a first subset of the plurality of openings.

3. The water management device of claim 2, the housing including a rear wall opposite the front wall, the rear wall defining at least part of the chamber, the rear wall including a second subset of the plurality of openings.

4. The water management device of claim 3, wherein the first subset of the plurality of openings are distinct from the second subset of the plurality of openings.

5. The water management device of claim 1, the housing including a rear wall opposite the front wall, the rear wall including a second subset of the plurality of openings.

6. The water management device of claim 1, the drainage element comprising extensions coupled to the sidewalls of the drainage element, the extensions extending past the front wall and into the chamber.

7. The water management device of claim 1, the housing comprising an upper wall pivotally coupled to the housing, the upper wall defining at least part of the chamber.

8. The water management device of claim 1, the drainage element comprising a second upper wall pivotally coupled to the sidewalls of the drainage element.

9. The water management device of claim 1, wherein the buoyancy device extends through the chamber.

10. The water management device of claim 1, wherein the channel comprises a cylindrical tube.

\* \* \* \* \*